April 16, 1957 W. H. BUTLER 2,789,219

DETECTOR OR DEMODULATOR

Filed Dec. 23, 1953

INVENTOR.

William Hamlin Butler

BY Victor J. Evans & Co.

ATTORNEYS 2,789,219

DETECTOR OR DEMODULATOR

William Hamlin Butler, Enid, Okla.

Application December 23, 1953, Serial No. 400,025

1 Claim. (Cl. 250—27)

This invention relates to a radio frequency demodulator or detector.

The object of the invention is to provide a demodulator or detector which will provide a very high signal to noise ratio and wherein the receiver will be held silent when no signal is present.

Another object of the invention is to provide a detector or demodulator wherein common types of man made noise such as automobile ignition and starters will not be detected and cannot be heard in the receiver, and wherein the tone quality of the receiver will be increased and wherein a noise limiter is not required, the present invention permitting demodulation in power type tubes of various kinds and wherein the speaker can be driven from the demodulation tube so that there can be a reduction in the manufacturing cost of good receivers.

A further object of the invention is to provide a detector or demodulator which is extremely simple and inexpensive to manufacture.

Other objects and advantages will be apparent during the course of the following description.

In the accompanying drawings, forming a part of this application, and in which like numerals are used to designate like parts throughout the same:

Figure 1:
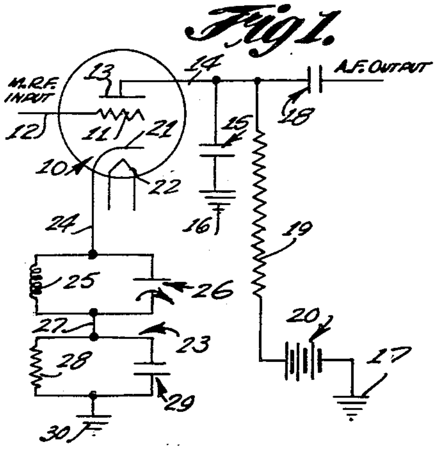
Figure 1 is a schematic view showing a wiring diagram for the detector or demodulator circuit when using a triode tube with resistance.

Referring in detail to the drawings, and more particularly to Figure 1 of the drawings there is shown a schematic wiring diagram illustrating a triode tube 10 provided with a resistance 19 coupled to the output line 14. The tube 10 includes the usual grid 11 that may be impressed with a modulated radio frequency input by means of the line 12, and a plate 13 is connected to the output line 14. A condenser 15 may be connected to the line 14, and the condenser 15 may be grounded as at 16. The resistance 19 may be connected to the line 14, and a condenser 18 can also be electrically connected to the line 14 so that the line 14 will supply or provide an audio-frequency output. The resistance 19 may be connected to a suitable source of electrical energy such as a battery 20 and the battery 20 may be grounded as at 17.

The tube 10 further includes the usual cathode 21 and may include a filament 22, and a line 24 leads from the cathode 21 to the tunable circuit which forms the present invention. The tunable circuit includes a coil 25 and a variable condenser 26, and the elements 25 and 26 are arranged in parallel with respect to each other. The tunable circuit further includes a resistance 28 and a bypass condenser 29, and the elements 28 and 29 are also arranged in parallel with respect to each other and are connected to the elements 25 and 26 by a line 27. The tunable circuit is grounded as at 30. The cathode circuit in Figure 1 is a resonant circuit which will allow only specified frequencies to pass through and into the plate circuit. In other words, there is an R. F. carrier with an impressed audio voltage coming into grid 11. The fact that the plate current is controlled by the tuned resonant cathode circuit will only allow the audio frequency to appear in the plate circuit.

Figure 2:
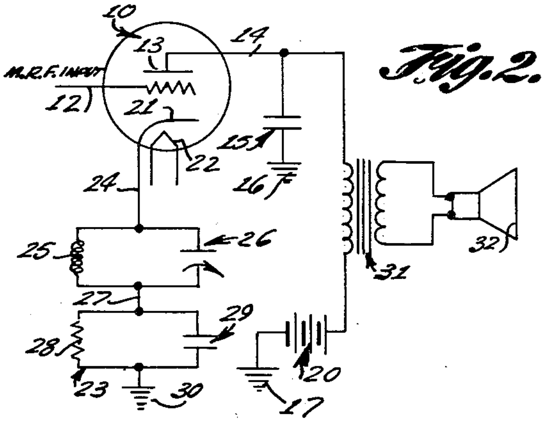
Figure 2 is a view similar to Figure 1 but showing a modification when using a triode tube with transformer coupled output.

Referring to Figure 2 of the drawings there is shown a detector or demodulator for use with the tirode tube 10 that has a transformer 31 coupled to the output 14 of the tube, and a speaker 32 is actuated by the transformer 31. The tunable circuit including the elements 25, 26, 28 and 29 are again connected to the cathode 21.

Figure 3:
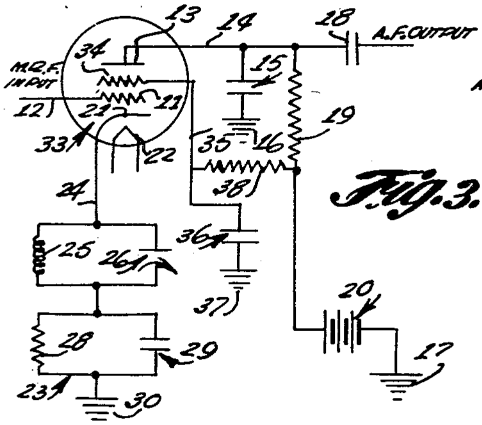
Figure 3 is a view similar to Figure 2 but showing a still further modification wherein a screen grid tube is used with a resistance coupled output.

Referring to Figure 3 there is shown a still further modification wherein the demodulator or detector is used and in Figure 3 there is shown a screen grid tube 33 wherein the screen is indicated by the numeral 34 and a line 35 leads from the screen 34, there being a condenser 36 in the line 35 and a ground connection 37. A resistance element 38 may lead from the line 35 to the resistance element 19. The tunable circuit providing the detector or demodulator is again connected to the cathode 21 in the tube 33.

Figure 4:
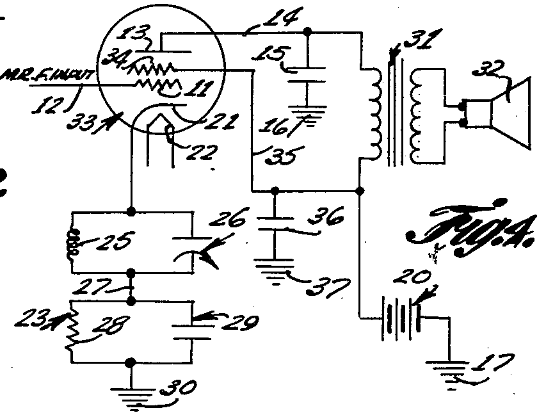
Figure 4 is a modified arrangement showing a screen grid tube with a transformer coupled output.

Referring to Figure 4 of the drawings there is shown a still further modified arrangement wherein the screen grid tube 33 has the transformer 31 and speaker 32 coupled to the output 14. The screen 34 has its line 35 connected to the condenser 36 and also to the line connected with the transformer 31. Again the circuit including the elements 25, 26, 28 and 29 are connected to the cathode 21.

Figure 5:
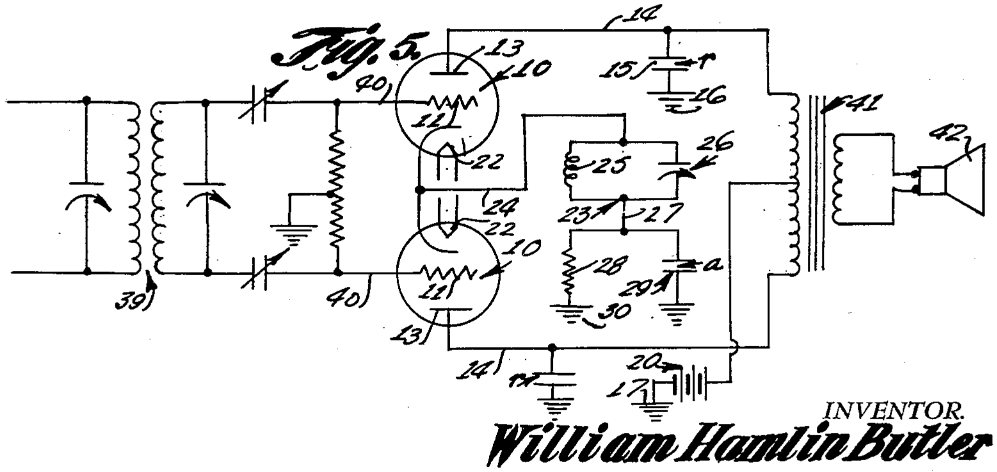
Figure 5 is a schematic wiring arrangement showing the use of two triodes in push-pull arrangement.

Referring to Figure 5 there is shown a still further modification wherein a pair of triodes 10 in push-pull arrangement are provided with cathodes 21 that have a single line 24 connected thereto. The line 24 is again connected to the coil 25 and variable condenser 26, and line 27 interconnects these elements to the resistor 28 and bypass condenser 29. The variable transformer 39 may be provided for supplying modulated radio-frequency input through the lines 40 to the grids 11, and a transformer 41 can be coupled to the output lines 14 for actuating a speaker 42.

From the foregoing it is apparent that a demodulator or detector has been provided which can be used with different circuit arrangements. Thus, as shown in Figure 1 the demodulator consists of a circuit 23 which is connected to the cathode 21 of the tube 10, and the tube 10 may be a triode tube with a resistance 19 coupled to the output 14. The cathode section of the tube includes the coil 25, variable condenser 26, resistor 28 and bypass condenser 29. In Figure 2 the tunable circuit is connected to the cathode 21 of the tube 10 and a transformer 31 is coupled to the output. In Figure 3 a screen grid tube 33 has its cathode 21 provided with the circuit, and in Figure 4 the screen grid tube has a transformer 31 connected to its output and also has the circuit arrangement connected to its cathode 21. In Figure 5 there is shown the circuit connected to cathodes of a pair of triodes 10.

The part that is new and different in the previously described arrangements is the cathode section of the tube including the elements 25, 26, 27, 28 and 29. The coil 25 and variable condenser 26 are of such values as to form a parallel resonance circuit at the frequency to be detected or demodulated. The resistance 28 is of such a value as to bias the tube as a class "A" amplifier. The condenser 29 is an audio-frequency bypass condenser in the order of .01 or .02 mfd. The modulated R. F.

input imposed on the grid 11 through the line 12 means the radio frequency to be demodulated or detected and in the case of superheterodyne receivers, it would be the final I. F. (intermediate frequency) stage. In the case of T. R. F. (tuned radio frequency) receivers it would be the final R. F. amplifier stage.

In frequency modulated receivers, as the frequency shifts through the tuned resonance frequency of the demodulator and preceding amplifier stage, the rectified R. F. appearing across the resistor 28 is at maximum diminishing as frequency is shifted to each side of the resonant frequency of the set and this of course recreates as variations in plate current the modulation which appeared in the transmitter to shift the transmitted signal.

The exact values for the coil 25 and condenser 26 depend upon the frequency to be demodulated. Also, the value of the resistance 28 depends upon the exact tube type used and the plate voltage at which it is to be operated. The elements 25 and 26 and also 28 may be either variable or fixed and in case of a T. R. F. receiver, the condenser 26 would be ganged with the tuning condensers and all operated with one rotor.

The advantages of the present invention are that there is a very high signal to noise ratio and very little noise with no signal. Also, common types of man made noise such as automobile ignition and starters are not detected and cannot be heard in the receivers and the tone quality of receivers is increased. Furthermore, a noise limiter is not needed and demodulation can be effected in power type tubes such as 6L6, 6F6, 6V6, 41 and the like, and the speaker may be driven from the demodulation tube with consequent reduction in manufacturing cost of good receivers. In addition to broadcast and communication receivers the demodulator will work on both the audio and video I. F. of television receivers. Actual results using this demodulator in a T. R. F. receiver and a superheterodyne receiver wherein the receivers were subjected to the following man made noises gave the following results. First, a one-quarter inch electric drill (commutator type motor) was held all around the antenna terminals and case and no noise appeared in the speaker. Second, a 1946 Ford truck was parked within ten feet of the receiver and caused no speaker noise when running and also the truck starter motor caused no sound in the speaker.

The demodulator will hold the receiver silent when no signal is present and the R. F. signal puts the circuit in condition to detect or demodulate. The audio output is only the reproduction of the modulation appearing on the R. F. carrier.

It is to be understood that the tube cathode shown in the drawings is only exemplary or illustrative of any known type and is intended to apply to all types of cathodes whether directly heated (filament type cathodes) by a separate transformer winding or battery heated, or indirectly heated by heater filament not connected to the cathode.

The cathode resistor 28 is of such value that with no signal on the tube grid 11, normal plate current will flow as in a class "A" amplifier. In this condition with no signal on the tube grid, the circuit cannot detect spurious electrical pulses or noise that are not related to the wave length to which the circuit is tuned and the receiver thus remains quiet. With a modulated radio frequency signal on the grid, the resonant circuit in the cathode section which includes the elements 25 and 26 form a high impedance at the tuned frequency which changes the grid bias of the tube in conformity with the audio frequency modulation that appears on the radio frequency signal applied to the grid of the tube.

In the case of frequency modulated R. F. signal, the effective signal power is greater at the tuned frequency and the radio frequency is shifted up and down across the tuned frequency. Since this changing or shifting of frequency occurs at an audible cycle rate, the change in tube bias conforms to the audible cycle producing corresponding changes in the plate current. In Figure 5 the letter *r* designates a radio frequency bypass and the *a* designates an audio frequency bypass. The value of *r* would be in the range of .00025 to .0005 mfd., and the value of *a* would be in the range of .01 to around .05 mfd. The present invention is not to be restricted to any values. Thus, the device will work with a condenser in the order of .01 to .02 mfd., but it will also work with values many times greater.

I claim:

In a demodulator or detector, a triode tube including a grid, a signal source of a modulated carrier frequency connected between said grid and a ground terminal, a plate and cathode, a tunable resonant circuit connected to said cathode and embodying a coil and variable condenser connected in parallel with respect to each other, a resistor and bypass condenser connected in parallel to each other, one end of said resistor and bypass condenser being connected to a ground terminal of a source of electric energy, the other ends of said resistor and bypass condenser being connected to said coil and variable condenser, said coil and variable condenser having such values to form a parallel resonant circuit as the carrier frequency, said resistor serving to bias the tube, an output line connected to the plate of said tube and having a condenser connected thereto, a second condenser having one end connected to said output line and its other end connected to said ground terminal, a modulating signal load impedance connected between said output line and a second terminal of said source of electrical energy.

References Cited in the file of this patent

UNITED STATES PATENTS

| | | |
|---|---|---|
| 2,038,879 | Willans | Apr. 28, 1936 |
| 2,186,130 | Wintringham | Jan. 9, 1940 |
| 2,189,313 | Hunt | Feb. 6, 1940 |

FOREIGN PATENTS

| | | |
|---|---|---|
| 731,104 | France | May 24, 1932 |
| 104,667 | Australia | Aug. 11, 1938 |